(12) United States Patent
Woltjes et al.

(10) Patent No.: US 6,749,880 B1
(45) Date of Patent: Jun. 15, 2004

(54) COMPOSITION BASED ON CROSS-LINKED STARCH AND DEPOLYMERIZED STARCH SUITABLE AS GELATINE REPLACEMENT

(75) Inventors: Jakob Roelf Woltjes, Veendam (NL); Heine Roelf Meima, Borgercompanie (NL); Pieter Lykle Buwalda, Groningen (NL)

(73) Assignee: Cooperative Verkoop-en Productivevereniging van Aaardappelmeel en Derivaten AVEBE B.A., Veendam (NL)

( * ) Notice: Subject to any disclaimer, the term of this patent is extended or adjusted under 35 U.S.C. 154(b) by 0 days.

(21) Appl. No.: 09/889,116

(22) PCT Filed: Jan. 28, 2000

(86) PCT No.: PCT/NL00/00059

§ 371 (c)(1),
(2), (4) Date: Dec. 27, 2001

(87) PCT Pub. No.: WO00/44241

PCT Pub. Date: Aug. 3, 2000

(30) Foreign Application Priority Data

Jan. 29, 1999 (EP) ............................................ 99200262

(51) Int. Cl.$^7$ ................................................. A23L 1/05
(52) U.S. Cl. ...................... 426/578; 426/573; 426/576; 426/661
(58) Field of Search ................................. 426/573, 576, 426/578, 661; 127/32, 67

(56) References Cited

U.S. PATENT DOCUMENTS

| | | | | |
|---|---|---|---|---|
| 4,504,509 A | | 3/1985 | Bell et al. .................... | 426/549 |
| 5,554,385 A | * | 9/1996 | Stroud ........................ | 424/456 |
| 5,576,043 A | | 11/1996 | Stankus et al. ............. | 426/578 |
| 6,093,439 A | * | 7/2000 | Whaley et al. ............. | 426/573 |
| 6,375,981 B1 | * | 4/2002 | Gilleland et al. ........... | 424/452 |
| 6,440,480 B2 | * | 8/2002 | Dorp et al. .................. | 426/573 |
| 6,531,174 B2 | * | 3/2003 | Barrett et al. ............... | 426/573 |

FOREIGN PATENT DOCUMENTS

| | | |
|---|---|---|
| EP | 0 768 042 A1 | 4/1997 |
| EP | 0 884 003 A1 | 12/1998 |
| EP | 0 898 902 A2 | 3/1999 |
| EP | 001145646 A1 * | 10/2001 |

* cited by examiner

*Primary Examiner*—N. Bhat
(74) *Attorney, Agent, or Firm*—Hoffmann & Baron, LLP

(57) ABSTRACT

The invention relates to hydrocoloids that are used as thickening, binding, gelling or stabilising agents used in the food industry. The invention provides a starch composition, comprising a first fraction comprising cross-linked starch and at least a second fraction comprising copolymerised starch. Said composition is suitable for example to serve as gelatine replacement in foodstuff of varied nature, and is preferably suitable for use in foodstuff such as confectionery.

13 Claims, No Drawings

COMPOSITION BASED ON CROSS-LINKED STARCH AND DEPOLYMERIZED STARCH SUITABLE AS GELATINE REPLACEMENT

This application claims priority based on an International Application filed under the Patent Cooperation Treaty, PCT/NL00/00059, filed on Jan. 28, 2000, and European Patent Office (EPO) 99200262.6, filed on Jan. 29, 1999, which are incorporated herein in their entirety by reference.

BACKGROUND OF THE INVENTION

The invention relates to hydrocolloids that are used as thickening, binding, gelling or stabilising agents in the food industry.

In the food industry hydrocolloids are in general used to thicken (gel, bind, stabilise) water-based foodstuffs. Gelatine is a popular hydrocolloid, which, contrary to other hydrocolloids which are mainly of a polysaccharide nature, is a protein. Gelatine is derived from animal slaughter offal, such as skins and bones, by hydrolysis of insoluble collagen into soluble gelatine. Collagen is the major structural component of white tissue fibers and present in all tissues and organs of animals where it constitutes almost 30% of total protein content.

Gelatine is used in a great number of food applications, where it is desired because it has a number of characteristics that are superior over other hydrocolloids used in the food industry. It is used for example as a thickening or gelling agent in jellied products such as confectionery and aspic type of foods; as a stabiliser and thickener in ice cream and icings, as emulsifier and thickener in dressings, desserts and sauces, as thickener in syrups and soups, as binder or thickener in general and as fining agent. For example, gelatine is used in gum and jelly products, such as wine gums, or gelling agent to give the end product an elastic, gummy structure. In particular, gelatine is superior over other thickening (gelling and binding) agents for the clarity and elasticity it renders to the food product.

The use of gelatine (or hydrolysed collagen) in the food industry, however, has recently been criticised because of its animal origin. Traditionally, gelatine containing foodstuff has been avoided by vegetarian consumers and by consumers whose religion teaches to avoid animal derived products like gelatine. These traditional gelatine avoiding consumers were in general satisfied with buying products that contained less superior binding agents to accommodate their vegetarian and/or religious preferences. More recently, however, the general consumer, albeit not bound by vegetarian or religious preferences, is also shifting to a preference for foodstuff wherein gelatine is replaced by another agent. Said shift in the preference of the general public is mainly understood to have been initiated by the recent occurrence of prion diseases such as seen with mad cow disease, and by concern that these prion diseases may infect humans with proteinaceous food of animal origin is eaten.

The prion diseases bovine spongiform encephalopathy (BSE) and scrapie of cattle and sheep, respectively, are fatal neurodegenerative diseases caused by prion proteins and are characterised by a long incubation period. In humans Creutzfeldt-Jakob disease (CJD), Gerstmann-Sträussler-Scheinker syndrome (GSS) and fatal familial insomnia belong to this category of transmissible spongiform encephalopathies (TSEs). Although scrapie, the prototype of the family of TSEs, in sheep and goats has been known for over 200 years and has been diagnosed world-wide, it is only since 1986 that BSE has been described in cattle in the UK. By January 1988, there had been 170,259 confirmed case of BSE in Great Britain and there may exist a great number of cases of not yet overt cases of BSE. BSE apparently emerged because scrapie contaminated sheep offal, via meat and bone meal had been included in cattle feeding-stuff, and newly infected cattle material was then recycled and eaten by susceptible cattle. Brain homogenates from cows with BSE produce a characteristic pattern of brain lesions in mice. This is identical to the pattern elicited by brain tissue from individuals who recently have died from new-variant Creutzfeldt-Jakob disease. Up to now, this variant has caused the death of 35 young Britons and one Frenchman.

There is also concern that the BSE strain that seems to be transmissible to humans may have infected sheep, where it could produce a disease hardly distinguishable from scrapie. Sheep BSE may be a threat to human health, although scrape by itself seems not to transmit to humans. Indeed, BSE agent has been transmitted experimentally to sheep by the oral route and thus could have the potential to infect sheet under field conditions.

Thus far, the only known cause of prion disease is an abnormal form of the normal prion protein called aberrant prion protein. Said aberrant prion protein is mainly characterised by its resistance to proteolytic hydrolysis, it is typically quite resistant against treatment with high or low pH, and generally only looses its infectivity after prolonged treatment under high temperature.

Although most governments in Western society have taken strict measurements to alleviate public concerns related to mad cow disease, for example by strictly banning the use of animal products derived from animals with prion disease in the food industry, public concerns related to using the protein derived gelatine still exist, and seem to be growing. Consequently, among the general public lives a growing desire to consume non-gelatine derived foodstuff, that, however, has similar or comparable superior characteristics as the traditionally gelatine comprising foodstuffs have.

SUMMARY OF THE INVENTION

It is an object of the present invention to provide a non-protein hydrocolloid that has suitable characteristics to serve as gelatine replacement in foodstuff of varied nature or that can be used to prepare new types of foodstuff.

The invention provides a starch composition, comprising a first fraction comprising cross-linked starch and at least a second fraction comprising depolymerised starch. Said composition is suitable for example to serve as gelatine replacement in foodstuff of varied nature, and is preferably suitable for use in foodstuff such as confectionery. Starches suitable for use in a composition according to the invention are for example chosen from maize, wheat, barley, rice, triticale, rice, millet, tapioca, arrow root, banana, potato, sweet potato starches or from high amylose starches like amylomaize, wrinkled pea starch, mung bean starch or from amylopectin rich starches like waxy maize, waxy barley, waxy wheat, waxy rice, amylopectin potato, amylopectin tapioca, amylopectin sweet potato or amylopectin banana starch. Amylopectin starches may be derived from plants that selectively produce amylopectin such as waxy cereals or amylose-free potato mutants and/or genetically modified plant varieties such as potatoes modified to selectively produce amylopectine. Cross-linked starch in general is a modified starch in which cross-links between starch macromolecules have been formed by means of bifunctional or polyfunctional chemical reagents, and results in the formation of large complexes of starch molecules with high molecular weight. Cross-links can for example be formed between amylose molecules or between amylopectine molecules, or between amylose and amylopectine molecules in the starch. Although not preferred from the viewpoint of ease of production, a first fraction according to the invention can of course also be partly depolymerised, or be modified in any other way, and a second fraction according to the invention can also be partly cross-linked, or be modified in any other way, if so desired.

Cross-linking starch in itself is a method known in the art and various agents are known. Examples are: epichlorohydrin, sodium trimetaphosphate, phosphorous oxychloride (POCl3), adipic anhydride, or other reagents with two or more halogen, halohydrin or epoxide groups or combinations which all can be used as cross-linking agents. Preferred are distarch phosphates and distarch adipates. A cross-linked or cross-bonded starch may for example of cross-bonded by 0.003 to 0.024% of adipic anhdyride, preferably by 0.01 to 0.03%. Prior to cross-bonding by adipic anhydride the starch may be treated with hydrogen peroxide and/or peracetic acid. Preferably with a quantity which corresponds to 0.001% to 0.045% of active oxygen, most preferably to 0.005 to 0.045%. A distarch phosphate may for example be cross-bonded by sodium trimetaphosphate up to such a degree that the residual phosphate is no more than 0.14% for a potato starch or 0.04% for other starches. Preferably the starch is cross-bonded with 0.01% to 0.25%, most preferably with 0.025 to 0.15% of sodium trimetaphosphate, under conditions known to the artisan. Of course it is always possible for the artisan to find conditions in which the reactants react with a very low yield, outside of the preferred conditions resulting in a starch with desired properties. A distarch phosphate may as well be cross-bonded with phosphorous oxychloride up to such a degree that the residual phosphate is not more than 0.14% for a potato starch or 0.04% for other starches. Preferably the starch is cross-bonded with 0.00010% to 0.01% of phosphorous oxychloride, under conditions known to the artisan. Of course it is always possible for the artisan to find conditions in which the reactants react with a very low yield, outside of the preferred conditions resulting in a starch with the desired properties.

Depolymerised starch is in general obtained by a reduction in the degree of polymerisation of the starch chains by physical, chemical or enzymatic action, and results in general in a reduction of the size (molecular weight) of the starch molecules. Depolymerisation by acid hydrolysis of starch can be accomplished in many ways known to the artisan. Preferred enzymatic hydrolysis, acid catalysed hydrolysis using organic or mineral acid and dry roasting of starches under acidic conditions (dextrination). In an embodiment of the invention the starch is hydrolysis in a slurry process using hydrochloric or sulphuric acid. During hydrolysis with acid the molecular weight of the starch by hydrolytic cleavage of the acetal function of the starch. Depolymerisation by oxidation of starch can also be accomplished an large number or ways. Known oxidation agents are sodium hypochlorite, calcium hypochlorite, sodium and potassium permanganate and hydrogen peroxide. Preferred is the hypochlorite oxidation of starch which is still one of the most useful reactions for the derivatisation of starches. Oxidised starches are applicable in a wide range of applications such as paper manufacture, adhesives, textile industry and food. Hypochlorite is a relatively cheap oxidation agent. During oxidation with hypochlorite different oxidation reaction may take place, of which the hydrolysis of the glucosidic bonds is the most important. Together with a decrease in molecular weight of the starch molecule also functional groups such as carbonyl and carboxyl groups are introduced. The instability of the glucosidic bonds is influenced by the presence of carbonyl or carboxyl groups. The course of an oxidation reaction is primarily controlled by the amount of hypochlorite, the pH, the temperature and the presence of a catalyst. An overview of the most important reaction parameters is depicted in article by J. Potze and P. Hiemstra in Starch; volume 15, page 217–225 (1963). The decrease in molecular weight, and the amount of functional groups is direct proportional to the amount of hypochloride. The oxidation rate is very sensitive for the pH during oxidation. The highest reaction rates rare obtained at neutral pH (pH about 7), the reaction rate decreases with increasing pH. The carbonyl content of oxidised starches is also controlled by the pH. At neutral pH the highest carbonyl contents are obtained. Due to this high amount of carbonyl groups, also a high amount of hydrolyses of the glucosidic bonds is observed at neutral pH, resulting in a decrease in viscosity of the resulting oxidised starch derivative. Increasing the oxidation pH results in a steady decrease in both carbonyl content and hydrolysis of the blucosidic bonds. Unfortunately, a high amount of carbonyl groups leads to viscosity instability of the oxidised starch. The introduction of carboxyl groups give rise to an increase in viscosity stability of the oxidised starch. Here too the amount of carboxyl groups is controlled by the pH, with a maximum at pH 9. Hypochlorite oxidations are mainly performed in slurry processes. The degradation of starch can be monitored by measuring the intrinsic viscosity. The intrinsic viscosity of depolymerised granular products lies between 0.2 and 2.5 dL/g, preferably between 0.3 and 1.5, mostly preferred between 0.4 and 1.2.

Surprisingly, by combining said fractions, each having distinct characteristics, a starch composition is obtained that demonstrates characteristics comparable to characteristics of gelatine, or even improving those of gelatine, most notably those relating to clarity and elasticity of the foodstuff when said composition is used as binding, thickening or gelling agent. Combining said two fractions according to the invention imparts said desired characteristics to the starch composition, making it suitable to use the composition as provided by the invention in the food industry to partly or even fully replace gelatine and to prepare new types of foodstuff. Said composition comprising said two fractions can for example be obtained by mixing separate starch fractions, a cross-linked fraction and a depolymerised fraction, in the desired ratio to obtain a starch composition as provided by the invention, however, it is also possible to obtain said composition by partial cross-linking and partial depolymerisation of a starch. However, a mixture of at least two fractions is preferred in the light of obtaining a starch composition according to the invention that is adjusted to for example the level of elasticity and/or clarity required of the foodstuff.

By virtue of the diverse fractions, said starch composition demonstrates characteristics that are close to or even improved over those of gelatine. The ratio at which the fractions shall be used are easily determined by mixing the testing the thus obtained compositions for desired properties. Suitable ratios of first fraction to second fraction (weight %:weight %) vary for example from 5:95 to 95:5, preferably from 10:90 to 90:10, more preferably from 25:75 to 75:25. For example, soft food products, such as soft sugar confectionery in which gelatine is traditionally used most, desire most elasticity, and by adjusting the ratio of the two fractions in the starch composition as provided by the invention, the desired clarity and/or elasticity can be obtained. Also, in hard confectionery products, where traditionally hydrolysed collagen is used in mixtures to replace gums, such as gum arabic, clarity and/or elasticity are now obtained using a starch composition according to the invention. In general when more elasticity is required, one increases the cross-linked fraction, and when more gelling and/or clarity is desired one increases the depolymerised fraction.

In a preferred embodiment, the invention provides a starch composition comprising a first fraction comprising cross-linked starch and at least a second fraction comprising depolymerised starch wherein said first fraction is cross-linked by using sodium trimetaphosphate, phosphorus oxytrichloride or adipic anhydrides, using for example a method known in the art. These cross-linking agents are most suitable for use in the food industry.

Preferred are cross-linked starch acetates having an acetyl content which corresponds to a DS or degree of substitution of 0.001 to 0.2, preferably from 0.03 to 0.092, most preferably from 0.05 to 0.092. The term DS used herein indicates the average number of sites per anhydroglucose unit of the starch molecule in which there are substituent groups.

Even more preferred are cross-linked hydroxypropylated starches having a hydroxypropyl content which corresponds to a DS of 0.001 to 0.3, preferably, 0.03 to 0.21, most preferably 0.06 to 0.21. In a further preferred embodiment the invention provides a starch composition according to the invention wherein said first fraction is also stabilised. Stabilisation in general is done by methods known in the art, such as by treatment with acetic anhydride or vinyl acetate, or comparable agents, but for the purpose of gelatine replacement a preferred embodiment is a composition according to the invention wherein said first fraction is stabilised by hydroxyalkylation, for example by hydroxypropylation. Stabilisation by hydroxyalkylation of starch is for example obtained with reagents containing a halohydrin, or an epoxide group as reactive site. The addition of hydroxypropyl groups is generally performed in aqueous suspensions of starch using propylene oxide, under alkaline conditions. Cross-bonding and/or stabilising reagents are reacted with starch under alkaline conditions. Suitable alkali materials are: sodium hydroxide; potassium hydroxide, ammonium hydroxide, magnesium hydroxide, sodium carbonate and trisodium phosphate. Preferred are the alkali metal hydroxides and carbonates, most preferred are sodium hydroxide and sodium carbonate. Sometimes salts are added as to prevent swelling under alkaline reaction conditions. Preferred are sodium chloride and sodium sulphate.

In a further embodiment, the invention provides a starch composition comprising a first fraction comprising cross-linked starch and at least a second fraction comprising depolymerised starch wherein said depolymerisation is for example achieved by acid or enzymatic hydrolysis. Preferred for the purpose of gelatine replacement, however, is a composition according to the invention wherein said second fraction is obtained by oxidation of starch, such as by treatment with sodium hypochlorite or hydrogen peroxide.

In a further preferred embodiment the invention provides a starch composition according to the invention wherein said second fraction is also stabilised. Stabilisation in general is done by methods known in the art, such as by hydroxyalkylation or by acetylation with acetic anhydride, vinyl acetate or comparable agents. For the purpose of gelatine replacement a preferred embodiment is a composition according to the invention wherein said second fraction is stabilised by acetylation. Stabilisation by acetylation is performed using acetic anhydride or vinyl acetate. Other stabilisation reagents are for example succinic anhydride, 1-octenyl succinic anhydride, sodium tripolyphosphate, potassium orthophosphate, sodium orthophosphate or orthophosphoric acid. In yet another embodiment, said second fraction is also cross-linked, for example by a suitable method as listed above, to provide even more elasticity (chewiness).

The invention also provides use of a starch composition according to the invention in the preparation of a foodstuff, preferably partly or fully replacing gelatine in said foodstuff. By using a composition according to the invention, it is possible to replace gelatine for more than 50%, up to 80% or even 100%, depending on the requirements of the customer. It is thus now possible to reduce gelatine content and select and use minimal quantities of those gelatine batches that are absolutely prion protein free, or to fully replace animal derived thickeners, such as hydrolysed collagen, or gelatine, that may be derived from slaughter offal comprising aberrant prion protein. In a preferred embodiment, said foodstuff comprises confectionery, for example sugar confectionery such as hard or soft sugar confectionery, lozenges or dragees, or confectionery for diabetics wherein the sugar is replaced by artificial sweeteners.

The invention furthermore provides a method for preparing a thickened (thickening herein also called gelling, stabilising or binding) foodstuff comprising mixing a starch composition according to the invention with a water-based liquid. Such a water-based liquid can for example be water, milk or another dairy product, a stock or bouillon, a sugar solution, a beverage or another water-based liquid food component known in the art. Of course, said method allows for the additional use of other ingredients, of which many are known in the art. Traditionally, gelatine was a first choice in thickening such liquids, however, due to consumer preference, a method to prepare non-gelatine foodstuffs is desired.

Furthermore, the invention provides foodstuff comprising a starch composition comprising a first fraction comprising cross-linked starch and at least a second fraction comprising depolymerised starch. Such foodstuff can for example be characterised by a clarity and/or elasticity that in general lives up to consumers expectations relating to gelatine comprising foodstuffs. In a preferred embodiment the invention comprises confectionery, as further exemplified in the detailed description herein without limiting the invention.

DESCRIPTION OF THE PREFERRED EMBODIMENTS

General overview of confectionery production

Sugar-based products, or sugar confectionery, can be divided into the following groups.
1. Hard sugar confectionery (fruit drops, clear mints, barley sugars, and bonbons)
2. Soft sugar confectionery (gums, pastilles, jellies, chewing gums, gelées, liquorice)
3. Lozenges (sheeted/pressed confectionery)
4. Dragees (coated confectionery).

In sugar confectionery starch products, natural gums and proteins are traditionally used as binding and/or gelling agents. There are two main types of soft sugar: gummy products like fruit gums, liquorice gums, pastilles, etc. and elastic products like wine gums, jellies, etc. A binding and/or gelling agent itself has specific properties, which influences the properties of the final product. For soft sugar confectionery applications gelatine is traditionally used as gelling agent, as it imparts a desired elasticity to the end product. In soft sugar confectionery thin boiling starches are commonly used to replace gelatine in part, however replacement of gelatine with thin boiling starches leaves the customer with products having a low acceptance as they have little elasticity.

The application of gelatine and mixtures of gelatine and thin boiling starches in soft confectionery is a well-known process. For instance in "Sugar Confectionery Manufacture" edited by E. B. Jackson, Blackie and Son, London 1990 an overview of different process equipment and product recipes are given. Gums, pastilles and jellies can be processed using a variety of techniques, batch cooking, direct cooking (jet cooker), indirect cooking or extrusion cooking. Batch process proceeds through atmospheric cooking in open pans. Colouring, flavouring and moulding and drying in starch moulds follows cooking. Direct cooking comprises two parts: cooking and a vacuum cooling part. The confectionery mass is pumped into the continuous (jet)cooker where it is heated with steam. The pressure of the steam determines the cooking temperature. The slurry is then pumped into the vacuum cooler, where it is cooled and all air removed. When the required concentration is reached, colours and flavouring can be added. The slurry can then be formed.

The present invention among others relates to the partial or full replacement of gelatine in confectionery. This can be for example be achieved by a using a starch composition comprising a combination of a thin boiling starch and cross-linked and stabilised starch. In one embodiment of the present invention the thin boiling starch is prepared by oxidation or acid degradation of starch. The starch may be oxidised by sodium hypochlorite or by hydrogen peroxide. The acid degradation may be performed with hydrochloric acid or sulphuric acid in slurry process.

Alternatively, the acid degradation can be achieved through a dextrination process using hydrogen chloride or sulphuric acid applying heat. The cross-bonding can be performed with sodium trimetaphosphate, phosphorus oxytrichloride or adipic anhydride using procedures known to the artesian. The stabilisation can be performed with propylene oxide, acetic anhydride or vinyl acetate. A thin boiling starch, is for example stabilised and oxidised or stabilised acid degraded.

Analytical procedures
Sensor evaluation

The confectionery was tested by a trained panel for a number of sensor features. The products were evaluated on a sensoric scale from 1 to 5, and a general acceptance scale from 1 to 10.

Testing the end products for the presence of cross-bonded starch derivatives

In order to determine the cross-linked starch in confectionery a sedimentation test was carried out. Therefor 20 gram wine gum was dissolved in a potassium dihydrogen phosphate/sodium hydroxide buffer at pH at 90° C. to give a solution of approx. 20%. The solution was cooled to room temperature and the amount of dry substance was measured with a refractometer. Then this solution was diluted to a 5% solution with deminarelised water. 100 ml solution was allowed to stand for 24 hours in a measuring cylinder. Afterwards the amount of sedimentation was estimated. The cross-linked starch could be identified under a microscope also.

Intrinsic viscosity (IV)

The intrinsic viscosity is determined in a known manner with a Ubbelohde viscosity meter with 1 M sodium hydroxide as solvent and expressed in g/dl.

EXAMPLE 1

The Preparation of Cross-Linked Hydroxypropylated Starch

A 39% starch slurry is prepared. To this slurry sodium sulphate (100 g/kg) and sodium hydroxide (7.5 g/kg starch) as 4.4% solution are added. The temperature was raised to 35° C. and POCl3 is added (15 to 200 μL/kg depending on the degree of cross-linking). Next propylene oxide (DSmax= 0.225) is introduced and the reaction was allowed to proceed 20–24 hours. The slurry was neutralized with sulphuric acid to pH 5–6 and washed and dried using conventional means known to the art. The starch used are potato starch and tapioca starch.

EXAMPLE 2

The Preparation of Cross-Linked Acetylated Starch

A 39% starch slurry is prepared of 1 kg of potato starch. To this slurry 25 g of sodium chloride and sodium hydroxide (7.5 g/kg starch) as 4.4% solution are added. The temperature was raised to 35° C. and sodium trimetaphosphate (400 or 600 mg depending on the degree of cross-linking) is added. The reaction is allowed to proceed for 6 hours. The slurry was neutralised with sulphuric acid to pH 8.5 and 61 g of acetic acid is added drop wise. After the decline of reaction the suspension is neutralised with sulphuric acid to pH 5–6 and washed and dried using conventional means known to the art.

EXAMPLE 3

The Preparation of Adipylated, Acetylated Starch

The adipate/acetate of amylopectin potato starch was prepared using a 1:20 mixture. 810 gram dry starch was suspended in water to 39% suspension. The pH was adjusted to 8.5 with a 4.4% (w/w) sodium hydroxide solution and 1.3 ml of 30% of H2O2 solution were added. Then 6 g of 1:20 adipic anhydride reagent was added drop wise keeping the pH at 8.5 with a 4.4% (w/w) sodium hydroxide solution. Afterwards 41 grams of acetic anhydride was added drop wise to a pH 8.5. The acetic anhydride reaction was performed in approx. 1.5 hours. After the acetic anhydride dosage the suspension was stirred for 10 minutes at pH 8.5. Then the suspension was neutralised with sulphuric acid to pH 5.5 and the final product was dewatered, washed and dried using methods known to the art.

EXAMPLE 4

The Preparation of Acid-Degraded Starch

A 39% starch slurry is prepared of 1 kg of potato starch and water. To this slurry 80 ml of 10 N sulphuric acid are added. The temperature was raised to 45° C. The reaction is allowed to proceed 17 hours. The slurry is neutralised with sodium hydroxide to pH 5–6 and washed and dried using conventional means known to the art.

EXAMPLE 5

The Preparation of Oxidised Starch

Starch was oxidised in aqueous suspension with sodium hypochlorite using sodium hydroxide as a catalyst. Thus 810 gram dry starch was suspended in water to 39% suspension. The temperature of the suspension was adjusted at 35° C.

Sodium hypochlorite was added, amounts corresponding with 10 grams of active chlorine and at the same time sodium hydroxide was added, as a 4.4% (w/w) solution, adjusting the pH to a value of 11. During the reaction the pH is kept at 11. When there was no active chlorine detectable the suspension was bleached with 5 ml sodium hypochlorite and after 1 minute the excess of chlorine was removed using sodium hydrogen sulphite.

Afterwards the suspension was neutralised with sulphuric acid to pH 5.5 and the final product was dewatered, washed and dried using methods known to the art.

EXAMPLE 6

The Preparation of Oxidised Acetylated Starch

Potato starch was oxidised in aqueous suspension with sodium hypochlorite using sodium hyroxide as a catalyst. Thus 810 gram dry starch was suspended in water to 39% suspension. The temperature of the suspension was adjusted at 35° C. Sodium hypochlorite was added, amounts corresponding with 10 grams of active chlorine and at the same time sodium hydroxide was added, as a 4.4% (w/w) solution, adjusting the pH to a value of 11. During the reaction the pH is kept at 11. When there was no active chlorine detectable the suspension was bleached with 5 ml sodium hypochlorite and after 1 minute the excess of chlorine was removed using sodium hydrogen sulphite. Afterwards the suspension was neutralised with sulphuric acid to pH 8.5. The temperature was adjusted to 25° C. and the suspension was acetylated using 36 g of acetic anhydride at a constant pH value of 8.5. The acetic anhydride reaction was performed in approx. 1.5 hours. After the acetic anhydride dosage the suspension was stirred for 10 minutes at pH 8.5. Then the suspension was neutralised with sulphuric acid to pH 5.5 and the final product was dewatered, washed and dried using methods known to the art.

According to the examples 1–6 the following starches were prepared.

TABLE 1

| product | starch | modification | amount of cross-linker |
|---|---|---|---|
| 1 | potato | oxidation | |
| 2 | tapioca | hydroxypropylation/cross-linking | 85 µL/kg |
| 3 | potato | hydroxypropylation/cross-linking | 15 µL/kg |
| 4 | potato | hydroxypropylation/cross-linking | 40 µL/kg |
| 5 | potato | acetylation/cross-linking | 100 µL/kg |
| 6 | potato | acetylation/cross-linking | 400 mg/kg |
| 7 | potato | acetylation/cross-linking | 600 mg/kg |
| 8 | amylopectin potato | adipylation/acetylation | 6 g/kg |
| 9 | potato | acid degradation | |
| 10 | potato | oxidation/acetylation | |

EXAMPLE 7

Preparation of Wine Gum Using Batch Process

A starch suspension is prepared using a starch:water ratio of 1:1.5 Into a batch-cooker (open pan) hot water is filled. Glucose-syrup (DE 42; Dormamix 42/82, Pfeiffer & Langen) is added and stirring is started. The cooker is heated and sugar is added while stirring. The heating continued until the mixture starts to boil. At this moment the starch suspension is added slowly, while stirring. Boiling is maintained until the desired dry solid is reached (74–76%) The mixture is cooled to 80° C. and colour, flavour and citric acid are added. The cooked solution is moulded into shapes in moulding powder. The resulting are dried for 24 hours at 50° C.

EXAMPLE 8

Preparation of Wine Gum Using Direct Cooking

A premix is made of a recipe containing sugar/glucose syrup (DE42; dormamix 42/82, Pfeiffer & Langen), starches and water. This premix is cooked at 1300 C. in a continuous cooker system from Vomatec. The cooked solution is cooled by applying vacuum. Colour, flavour and citric acid are added to the cooled solution. This solution is moulded into shapes in moulding powder. The moulded products are dried and subsequently evaluated.

According to example 8 the following mixtures were prepared and moulded into shapes.

TABLE 2

| Exp. nr Starch comp. | A | B | C | D | E | F | G | H | I | J | K | L |
|---|---|---|---|---|---|---|---|---|---|---|---|---|
| 1 | 9 | 9 | 9 | 9 | 9 | 9 | 9 | | 8 | | 12 | |
| 2 | 3 | | | | | | | | | | | |
| 3 | | 3 | | | | | | | 3 | | | 3 |
| 4 | | | 3 | | | | | | | | | |
| 5 | | | | 3 | | | | | | | | |
| 6 | | | | | 3 | | | | | | | |
| 7 | | | | | | 3 | | | | | | |
| 8 | | | | | | | 3 | | | | | |
| 9 | | | | | | | | 9 | | 8 | | |
| gelatine* | | | | | | | | | 4 | | | |
| gelatine* | | | | | | | | | | 4 | | |
| 10 | | | | | | | | | | | | 9 |
| sugar | 34 | 34 | 34 | 34 | 34 | 34 | 34 | 34 | 30 | 30 | 34 | 34 |
| Glucose-syrup | 34 | 34 | 34 | 34 | 34 | 34 | 34 | 34 | 38 | 38 | 34 | 34 |
| water | 20 | 20 | 20 | 20 | 20 | 20 | 20 | 20 | 20 | 20 | 20 | 20 |

*gelatine 240 bloom

The resulting products were evaluated. The results are summarised in table 3.

TABLE 3

| Exp. | elast. | clarity | general |
|---|---|---|---|
| A | 4 | 3 | 7 |
| B | 4 | 3 | 6 |
| C | 4 | 3 | 7 |
| D | 4 | 2 | 3 |
| E | 3 | 3 | 4 |
| F | 3 | 2 | 3 |
| G | 3 | 3 | 3 |
| H | 3 | 3 | 3 |
| I | 4 | 3 | 7 |
| J | 4 | 3 | 7 |
| K | 1 | 1 | 2 |
| L | 5 | 4 | 8 |

EXAMPLE 9

| Preparation of liquorice | |
| --- | --- |
| Product 1 | 9% |
| Product 3 | 3% |
| Sugar | 28% |
| Glucose-syrup DE 42 | 32% |
| Ammonium chloride | 4% |
| Liquorice powder | 4% |
| Water | 20% |

The resulting liquorice had a gummy, elastic texture

What is claimed is:

1. A starch composition comprising a first fraction comprising cross-linked starch and at least a second fraction comprising depolymerized starch.

2. A composition according to claim 1 wherein said first fraction comprises starch cross-linked by using sodium trimetaphosphate, phosphorus oxytrichloride or adipic anhydride.

3. A composition according to claim 1 wherein said first fraction further comprises stabilized starch.

4. A composition according to claim 3 wherein said first fraction is stabilized by hydroxyalkylation.

5. A composition according to claim 1 wherein said second fraction comprises depolymerized starch obtained by oxidation.

6. A composition according to claim 1 wherein said second fraction further comprises stabilized starch.

7. A composition according to claim 6 wherein said second fraction is stabilized by acetylation.

8. A composition according to claim 1 wherein said starch is derived from potato.

9. A method for preparing a thickened foodstuff comprising mixing a starch composition comprising a first fraction comprising cross-linked starch and at least a second fraction comprising depolymerized starch with a water-based liquid.

10. A method according to claim 9 wherein said foodstuff comprises confectionery.

11. Foodstuff comprising a starch composition comprising a first fraction comprising cross-linked starch and at least a second fraction comprising depolymerized starch.

12. A foodstuff according to claim 11 wherein the use of said composition at least partly replaces the use of gelatine in said foodstuff.

13. Confectionery comprising a starch composition comprising a first fraction comprising cross-linked starch and at least a second fraction comprising depolymerized starch.

* * * * *

UNITED STATES PATENT AND TRADEMARK OFFICE
CERTIFICATE OF CORRECTION

PATENT NO. : 6,749,880 B1
DATED : June 15, 2004
INVENTOR(S) : Woltjes et al.

It is certified that error appears in the above-identified patent and that said Letters Patent is hereby corrected as shown below:

Column 2,
Line 1, now reads, "By January 1988, there had been 170,259 confirmed case of" should read -- By January 1998, there had been 170,259 confirmed cases of --
Line 19, now reads, "route and thus could have the potential to infect sheet under" should read -- route and thus could have the potential to infect sheep under --

Column 4,
Line 14, now reads, "oxidation. The highest reaction rates rare obtained at neutral" should read -- oxidation. The highest reaction rates are obtained at neutral --
Line 23, now reads, "carbonyl content and hydrolysis of the blucosidic bonds." should read -- carbonyl content and hydrolysis of the glucosidic bonds. --

Column 9,
Line 17, now reads "sodium hypochlorite using sodium hyroxide as a catalyst." should read -- sodium hypochlorite using sodium hydroxide as a catalyst. --

Signed and Sealed this

Thirty-first Day of May, 2005

JON W. DUDAS
*Director of the United States Patent and Trademark Office*